May 22, 1934.  H. J. JACOBSON  1,959,628
FILLET FORMING AND APPLYING DEVICE
Filed Aug. 17, 1931  2 Sheets-Sheet 1
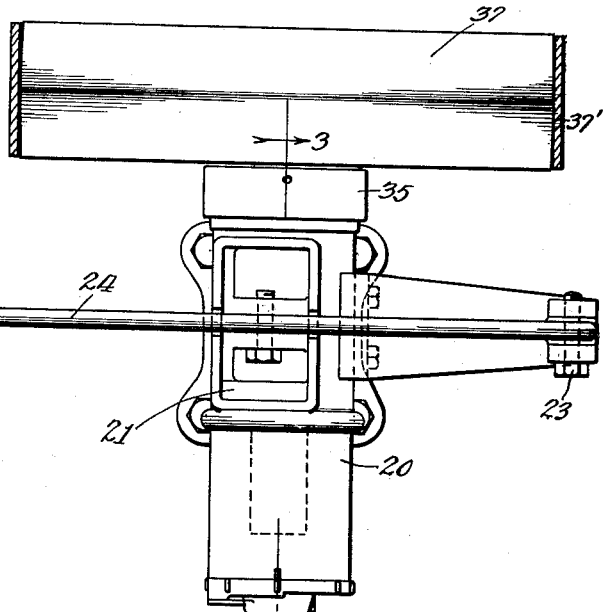
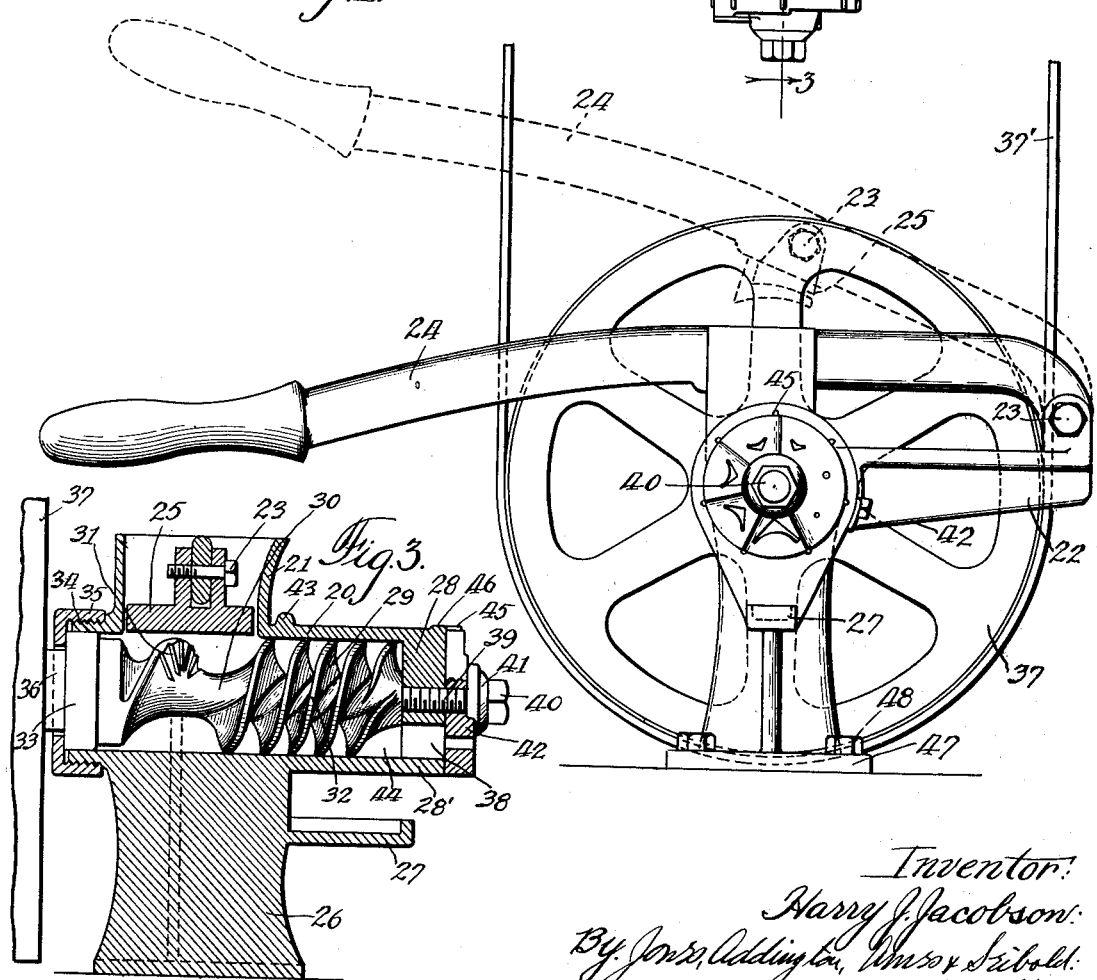

May 22, 1934.  H. J. JACOBSON  1,959,628
FILLET FORMING AND APPLYING DEVICE
Filed Aug. 17, 1931   2 Sheets-Sheet 2
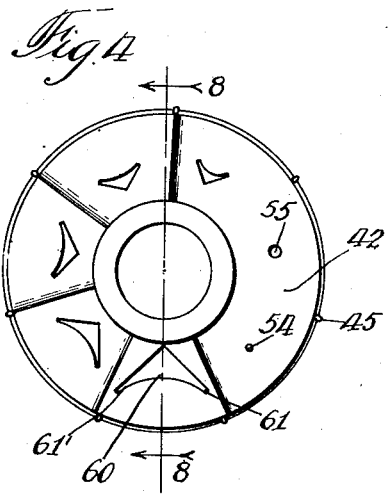
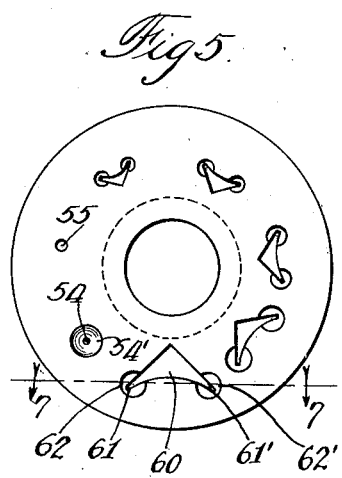
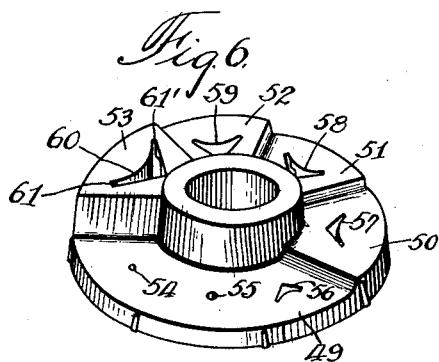
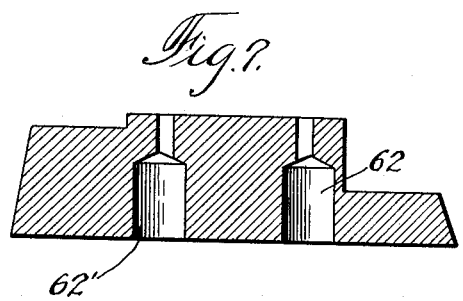
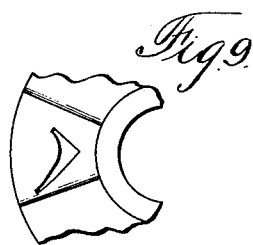
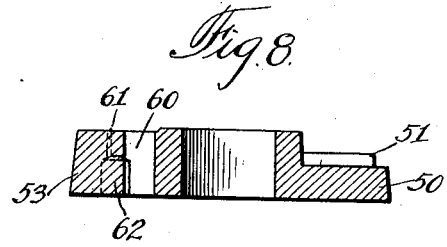
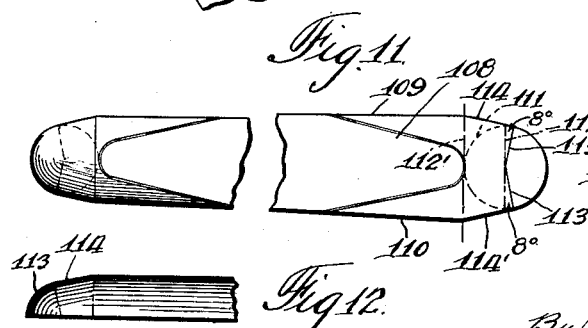
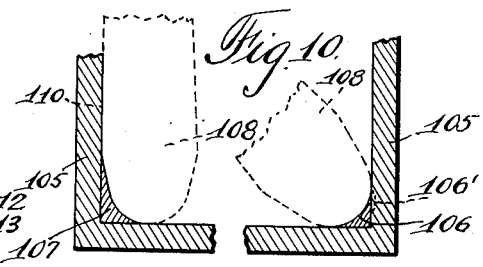
Inventor.
Harry J. Jacobson.
By Jones, Addington, Ames & Seibold
Attys Patented May 22, 1934

1,959,628

UNITED STATES PATENT OFFICE 1,959,628

FILLET FORMING AND APPLYING DEVICE

Harry J. Jacobson, Chicago, Ill.

Application August 17, 1931, Serial No. 557,441

10 Claims. (Cl. 18—12)

The present invention relates to a device and appurtenances for the rapid production of fillets such as are employed particularly in the pattern-making art.

One of the objects of the invention is to provide means for shearing a thermoplastic substance from a body of said substance by suitable shearing means, followed by gradual and continued compression of said substance, while maintaining the material at the proper temperature, so as to bring it into a plastic state, whereafter the said body is extruded through suitable dies so as to form a continuous strip of the desired fillet, said fillet having certain hereinafter described configurations and properties.

A further object of the invention is to provide, in combination with an extrusion machine of the rotary compressional type, a movable die-plate containing a plurality of openings of different sizes and shapes, said openings being capable of accurate alignment with a general extrusion opening located at and leading from the compression chamber of the said extrusion press, being parallel to but below the central longitudinal axis of the machine.

A further object of the invention is to provide dies which are of such shape and form that the material extruded therethrough will issue in a predetermined form with a high degree of accuracy and in such a manner that the speed of passage of the plastic material through the die will be substantially uniform, whereby inequalities and distortion of the formed fillet are avoided.

A further object of the invention is to provide an extrusion die in which the central portion of the extruded matter has a comparatively large cross-sectional area, while the end portions thereof, which have a smaller cross-sectional area, pass through a portion of the die which is considerably thinner than the portion through which the main part of the die is forced.

Still a further object of the invention is to produce a multiple-die plate containing openings of continually increasing size, the portions of said die-plate containing said separate dies being of increasing thickness, which thickness bears a mathematical relationship with the cross-sectional area of the extruded material.

Still a further object of the invention is to produce a fillet which is asymmetric; that is to say, which has a special configuration, which may be roughly described as consisting of an unsymmetrical right-angled triangle whose hypotenuse has been bent inwardly toward the right-angle in a certain manner hereinbelow described in detail.

Still a further object of the invention is to provide a tool for the application of said asymmetric fillet, said tool corresponding in outline to the shape of the fillet and having a straight side capable of being applied to a side of the pattern so as to insure the proper relationship of the various sides of the fillet. This tool is also used to apply the standard or symmetrical fillet by holding its flat surface away from the wall of the pattern.

A further object of the invention is to provide an extrusion press of very simple construction in which there are means for forcing a potentially plastic material against cutting means and which press is also provided with an end piece of solid heavy metal construction capable of being heated so as to act as a heat reservoir or equalizing means to control the temperature of the material being extruded. This same heavy construction will also assist in keeping down the temperature which is produced by the friction and compression of the extrusion press, so that the plasticity of the extruded fillet will be substantially constant during the extrusion operation.

Further objects of the invention will become apparent from the description hereinbelow when taken in connection with the drawings that form a part of the present application. In these drawings—

Figure 1 is a top plan view of the extrusion press and die, all assembled and ready for use;

Fig. 2 is an end view of the machine shown in Fig. 1, showing in dotted lines the changed position of the means employed in forcing a potentially plastic mass into the extrusion press;

Fig. 3 is a cross-sectional view along the lines 3—3 of Fig. 1, showing the interior construction of the press;

Fig. 4 is an obverse view of the preferred form of die used in connection with the press;

Fig. 5 is a reverse view of the die, that is, a reverse of that in Fig. 4;

Fig. 6 is a true perspective view of the die;

Fig. 7 is a cross-section on an enlarged scale substantially two times that of Fig. 5, taken along the line 7—7 of said figure;

Fig. 8 is a cross-section through the die along the lines 8—8 of Fig. 4;

Fig. 9 is an obverse view of a fragment of a die like that shown in Figs. 4 to 8, inclusive, but showing an extrusion opening having an asymmetric shape, as above mentioned;

Fig. 10 is a diagrammatic cross-sectional view of a pattern having applied to its corners fillets of both types, also showing in dotted lines the method of using the tool hereinabove mentioned;

Fig. 11 is a bottom view of the tool used for applying the fillets; and

Fig. 12 is a fractional side view thereof.

Corresponding numbers in the drawings herein apply to the same parts in each drawing.

Referring now to Figs. 1, 2, and 3, it will be seen that the completely assembled device consists of a metallic body portion 20 which is substantially tubular in shape and which is provided with a charging funnel 21. Attached to said body portion there is a bracket 22 which serves to support, by means of a bolt 23, a hand lever 24 to which there is pivotally attached a member 25 for applying pressure to any material that may be placed within the confines of the said funnel 21. The said body portion also has integrally cast therewith a lower supporting or stand portion 26 which has a dished extension 27 for the reception of combustible fluid such as alcohol or the like.

The said body portion 20 is made of metal which is considerably heavier near one end 28 and 28', so that the said end may have a greater heat-storage capacity than the balance of the housing.

Within the housing 20 there is a compression screw broadly designated as 29, which has a variable pitch, being somewhat enlarged as to pitch at 30. Near the point of origin of the said compression screw there are a number of radially extending shearing edges 31 which are located substantially immediately beneath the forcing member 25. The spiral that constitutes the screw is of substantially the same size as the interior of the housing, so that the edges 32 of the screw will make close contact therewith and any material caught therebetween will be, on the rotation of said screw, in the proper direction to be forced toward one end thereof so as to extrude the material through the device to be described further hereinbelow. The other end 33 of the screw is made circular and fits accurately into the rearwardly projecting portion 34 of the housing, the outer portion of which is threaded at this point. An internally threaded collar 35 serves to maintain the screw within the housing and also has extending through the central opening of said collar a shaft 36 to which there is suitably keyed a driving pulley or wheel 37. At the extrusion end (the right-hand side, as shown in Fig. 3) there is provided an opening 38 through which the plastic material transported by the said screw is forced by the rotation of the latter.

The end 28 of the housing 20 is provided with an internally threaded opening into which there may be inserted a screw 39 provided with a head 40 and a collar 41, which serves to hold in place, in accurate register with the opening 38, a die-plate 42, which latter is described in detail in connection with Figs. 4 to 9, inclusive.

The housing 20 is provided, near the point of origin of the filling funnel 21, with a protuberance 43 whose function is to prevent heat from the flame produced by burning alcohol in the cup 27 from being transmitted to the funnel and forcing and cutting portions of the machine.

The operation of the compression and extrusion means will readily be understood from an inspection of the drawings, particularly Fig. 3. A suitable plastic composition—which may consist of beeswax to which there may have been added certain oils such as linseed oil, or a mixture of waxes or other potentially plastic material—is fed into the funnel 21 after the lever 24 has been lifted so as to allow access thereto. A piece of wax having been placed in the opening, the lever 24 is depressed and the pulley 37 is rotated by any suitable means as, for instance, by means of the belt 37'. The rotation will be counterclockwise, as shown in Fig. 2, which in Fig. 3 would make the top of the pulley 37 move outwardly of the paper toward the beholder, while the bottom of the pulley would move away from the beholder. In other words, the motion is clockwise when viewed from the pulley side and counterclockwise when viewed from the die side. The lever 24 being depressed, the forcing member 25 will force the wax against the cutting edges 31, whereby the wax will be cut into small fragments which, by reason of the spiral of the screw, will be conveyed into the compression portion 44 of the machine. As the pitch of the screw becomes less, the compressional force under the same rotation speed and force will increase.

In many cases, with a soft wax, the work done upon the material by the compression will serve to plasticise or soften the same; but in order to make sure that this may take place early in the operation of the machine, it is highly advisable to prewarm the extrusion end of the machine by the expedient of pouring a combustible fluid, such as alcohol, into the cup 27 and igniting the same, whereby the flame produced will lap about the heavy metal portion 28 and will heat the same up to the softening point of the wax. The cup 27 is used only for preheating. It is built to hold such an amount of alcohol that, when burned out completely, the machine will be heated to the proper temperature. Thereafter the friction of the plastic material creates sufficient heat to maintain the desired temperature. Inasmuch as the compression exerted upon the wax produces heat, this will also be transmitted to the heavy metal portions of the machine, so that the heat will soon become more or less equalized and the wax being extruded will be of substantially the same degree of plasticity.

The wax which is compressed in the compression portion 44 of the housing 20 passes through the passage 38 and then emerges through any one of the openings of the die-plate 42, emerging from the outside thereof in the form of a continuous strip whose cross-section will correspond to that of the opening in the die. It will be obvious that if care is taken to supply the wax or other plastic material at a sufficient rate to maintain the compression chamber filled at all times, there will thus be produced a continuous ribbon or strip of extruded material in the form of fillets, for the production of which the present machine is primarily intended.

The die-plate 42 is provided with a series of ridges or elevations 45 which are intended as guides that register with a slight projection 46 at the top of the machine. In order to adjust the die-plate to any particular opening, the screw 41 is loosened and the die-plate turned until the proper opening is in front of the passage 38, the accuracy of the setting being judged by the proper alignment of the ridges 45 with the projection 46.

The entire machine is bolted or otherwise secured to a bench or support by means of a foot 47 and lag screws or bolts 48.

The speed of the machine is comparatively slow, but the extrusion rate is, of course, entirely dependent upon the size of the opening. By extrusion speed is meant the number of linear feet per second of material produced. Inasmuch, however, as the smaller openings present a greater resistance, this is not necessarily related to the speed of rotation. An ordinary, good working speed is about 30 to 35 R. P. M.

The present application is a continuation of application Serial No. 277,555 of the same applicant, filed May 14, 1928, in so far as the extrusion press itself is concerned and is a continuation in part as to the details of the extrusion dies.

Referring now to Figs. 4 to 8, inclusive, which illustrate in detail the novel extrusion die used in connection with the machine illustrated in Figs. 1 to 3 and described in detail hereinabove, the general configuration of the die may best be seen in Fig. 6, which is a life-sized perspective drawing showing its general appearance. It will be noticed that it consists of a single die-casting or otherwise formed piece of metal which, in the preferred embodiment, consists of aluminum or an aluminum alloy but may be of brass, bronze, non-rusting alloys, or the like. The die 42 itself consists of a number of sections 49, 50, 51, 52, and 53, which, in the order given, are of increasing thickness. It will be noticed that section 49 contains three openings—a very small circular opening 54, a somewhat larger opening 55, and an arcuate opening 56; while section 50 has an arcuate opening 57, section 51 a similar opening 58, section 52 a similar opening 59, and section 53 a similar opening 60. It will be seen that the arcuate openings are larger in those sections which are thicker. The reason for this is that, with the same pressure in the extrusion portion 44 of the machine, more product will be forced through the extrusion die.

As the cross-sectional area of the extruded material increases, it will have a powerful tendency to travel faster at the center, where it is under no restraint by contact with the center of the die, than it will have where it contacts with the die. Inasmuch as the material is quite plastic, it is necessary—in order to insure an accurate cross-section thereof—that the same be under the guidance of the sides of the die for a longer time when making a larger extruded article than when making a smaller one. For this reason, in the largest opening 60 the thickness of the die is from three to four times that of the section 49 that contains the arcuate opening 56. The necessity for providing a longer travel for the larger article is, however, complicated by the fact that the openings are of a shape which in general consists of a right-angled triangle, the hypotenuse of which has been replaced by an arc of a circle slightly smaller than an inscribed circle were the triangle duplicated so as to form a square. This brings about a diminution of the cross-sectional area of the extruded material when it reaches the portions of the die where it is narrowed, as—for example—at the parts 61 and 61'. This is most readily seen by an inspection of Figs. 4, 5, and 6.

In order to prevent the undue friction set up by the fact that the cross-sectional area is smaller at 61 and 61', which would cause the center of the mass of extruded material to exceed in speed that of the edges thereof, it has been discovered that this difficulty can completely be avoided by rendering the distance of travel near the edges 61 and 61' considerably less by the expedient of drilling out the die at those points. This is accomplished, as will be seen in Figs. 5 and 7, by drilling round openings partially through the die from the reverse face thereof, as for instance at 62 and 62'. This is shown on a doubly enlarged scale in Fig. 7 and on a life-sized scale in Fig. 8, in which latter figure the main, larger opening of the die 60 is also shown. The other die openings of small size, such as 59, 58, 57, and 56, likewise are bored out to a substantial depth, as can be seen in Fig. 5, the reason being the same. As far as the smallest opening 54 is concerned, this is also partially drilled away or countersunk at 54', while the somewhat larger opening 55 is flush with the die-plate. Thus when the material to be extruded is, for example, forced through the die 60, the central portion thereof is free to pass. If the portions 61 and 61' were not drilled away, they would, by reason of the close contiguousness of the walls of the die, be so retarded that they would be sheared off, and therefore the extruded fillet would not conform to the shape of the die. By providing, however, the drilled openings 62 and 62', the wax or other plastic material is only compressed into the form of the end portions 61 and 61' just before it leaves the die, the result being a perfect fillet which is accurate and suitable for use for filleting patterns in a well known and approved manner.

The substantive inventive thought, in so far as the die is concerned, lies in the appreciation of the necessity for increasing the thickness of the die in proportion to the cross-sectional area of the extruded material and also for prevention of irregularities in the latter by the expedient of drilling out the die near the narrowed portions thereof. It is believed that this thought is new in the die-extrusion art and hence particular emphasis will be laid upon this construction in the claims hereunto appended.

Referring now to Figs. 9, 10, 11 and 12, which illustrate a novel form of fillet, a tool for its application, method of its use, and the reasons for its asymmetric configuration:—Referring first to Fig. 10, this represents a cross-section of a pattern having a usual body 105, showing a fillet 106 of ordinary construction and a fillet 107 made in accordance with the present invention. Referring first to fillet 106, the curvature thereof corresponds substantially to the arc of a circle, this fillet being put in place and evened out by the application of a warm steel ball, in the usual manner known to pattern makers. When such a pattern, known as a master pattern, is used to make a mold from which a metal pattern casting is to be made from a metal such as aluminum or brass, a slight shrinkage or depression occurs as at 106. In preparing this casting for use as a metal pattern, it is very difficult to remove this depression. Therefore provision has been made for extra metal at this point, and this extra material produces a master casting which comes clean from the mold without causing the difficulty just mentioned.

In Fig. 9 there is shown a fragmentary obverse view of a die suitable for extruding such a fillet, this die being made in accordance with the teachings already hereinabove discussed in connection with Figs. 4 to 8, inclusive; that is to say, where the proportions are narrow, the die has been drilled out from the back so as to equalize the speed of transmission of the extruded material. The improved fillet differs from the fillet made from the ordinary dies shown in Figs. 4 to 8 in that the portions of it which are apparently curved consist in effect of an arc of a circle and then a straight line. In applying this fillet, the tool illustrated in Figs. 11 and 12 is used, this tool being shown in dotted lines in Fig. 10.

The tool 108 consists of a suitable metal, preferably aluminum or an aluminum alloy, which has two substantially straight sides 109 and 110. The ends of the said tool are in the form of an arc of a circle 111, said arc being 164°. This relationship is shown in Fig. 11, in which the circle is shown partly in dotted line and partly in solid line, the solid line representing the end of the tool 108. In order to explain the layout of the end of this tool, this circle 111 has been inserted in the drawing, although, of course, it does not appear on the tool. Drawing the diameter 112 through this circle at right angles to the longitudinal axis of the tool 108, two radii 113 and 113' are drawn so that each makes an angle of 8° with the said diameter 112. Tangent to the circle at the point where the said radii meet the circumference thereof, and hence at right angles to the said radii, there are struck off two straight lines 114 and 114'. There is also drawn a straight line 112' tangent to the circle and parallel with the diameter 112. The intersection of this line 112' with the said straight lines 114 and 114' defines the latter, after which the straight sides of the tool continue at a slight angle to said straight lines 114 and 114', the two sides 109 and 110 being not strictly parallel but converging so as to eventuate at the other end of the tool in straight lines and arcs of a circle which are smaller than those just described but which are geometrically similar. It will thus be seen that the end of the tool consists of an arc of a circle covering 164°, two short straight lines, and then the sides of the tool itself.

In order to insure the accuracy of the tool, it is rounded off as shown in Fig. 12, still maintaining the arcuate and straight-line relationships. In other words, the straight line 114 in Fig. 12 represents a section through a frusto-conical body generated by the rotation of the line 114 in its proper relationship about the central axis of the tool itself, while the portion 113 in Fig. 12 would represent a segment of a sphere, being 8° less than that of a hemisphere. The reason for this geometric relationship can best be appreciated by again inspecting Fig. 10, where the fillet is shown applied to the angle of the pattern 105. The side 110 of the tool is placed against the pattern with the tip of the tool resting on the bottom of the pattern. Then the outline of the tool will define the outline of the fillet.

In using the tool, it is warmed to the softening point of the plastic material of which the fillet is constituted, for example, beeswax; and the tool is then accurately laid against the side of the pattern and is moved so that the lower fillet-shaping end thereof will gradually press the fillet into the corner, while maintaining its specific configuration. For fillets of different sizes, tools of different sizes may, of course, be employed, the present tool being so arranged that fillets of two different sizes may be made therefrom.

Figures 11 and 12 have been drawn exactly the size of the device itself, except that the tool is shown broken off in Fig. 11, but the two ends thereof are accurate reproductions of the ends of the device, this being also true of the fragmentary end shown in Fig. 12.

The particular advantage of a fillet of this shape has already been described, and actual experience has shown that it presents great advantages over the ordinary fillet which has a purely arcuate shape. It is contemplated to furnish with the entire device a set of die-plates and tools producing both arcuate fillets and asymmetric fillets, the tool corresponding to the openings in the die carrying the asymmetric fillets, thus providing a pattern-maker with a machine which will supply him with fillets of every possible type. For shaping the small fillets extruded through openings 54 and 55, the ordinary ball tool may be employed, as in such small patterns the difficulties complained of herein are not met.

The present invention is a distinct contribution to the art of producing fillets and enables much more accurate patterns to be made. Furthermore, in the present day of mass production of sand mold castings, much greater efficiency results from a pattern which draws from the mold without disturbing the sand.

What it is desired to protect by Letters Patent is the following:

1. A device of the type described comprising a body portion having a compartment therein, an inlet for said compartment, an outlet for said compartment, and a rotatable member disposed in said compartment, said rotatable member comprising a compression screw provided with threads whose outer edges are disposed in registration with the wall of said compartment, said screw having radially extending grooves on the threads thereof, forming cutting edges extending outwardly to the outer edge of said threads.

2. A device of the type described comprising a body portion having a compartment therein, an inlet for said compartment, an outlet for said compartment, and a rotatable member disposed in said compartment, said rotatable member comprising a compression screw provided with threads whose outer edges are disposed in registration with the wall of said compartment, said threads having radially extending grooves forming cutting edges extending outwardly to the outer edge of said threads, said cutting edges being adapted to sever portions from a solid object disposed in said compartment through said inlet opening and force the severed portions through said compartment to said outlet.

3. An extrusion die for extruding plastic material comprising a plate having an opening therein, the walls of which opening are longer at the points where the extruded material is thicker and shorter where the latter is thinner.

4. An extrusion die comprising a plate having an opening therein whose cross-section is not uniform, the walls of which opening are longer at the points where the extruded material encounters the least resistance and shorter where it encounters the most resistance.

5. A device for forming plastic material by extrusion, consisting of a plate provided with a plurality of openings therein, the plate being thicker where the openings are larger and thinner where they are smaller.

6. A device for forming plastic material by extrusion, consisting of a plate which progressively increases in thickness in a number of definite steps, being provided with a number of openings of increasing cross-sectional area, the steps and openings being directly proportional to each other, so that the larger openings are in the thicker parts of the plate.

7. A die-plate for use on an extrusion machine, consisting of a substantially disk-shaped body varying in thickness by definite degrees or steps and provided with a plurality of openings therein of varying cross-section, the openings and steps being directly proportional to each other, so that the openings of larger cross-section are in the thicker parts of the disc.

8. An extrusion die having a three-sided opening therein bounded on two sides by straight lines which meet at right angles to each other and on the third side by a curve, the thickness of said plate being diminished at the meeting points of said lines and curve by being there provided with a drilled opening that partially penetrates said plate.

9. An extrusion die comprising a plate varying in thickness by definite steps or degrees, provided with a plurality of round openings and at least one three-sided opening, which latter is bounded on two sides by planes at right angles to each other extending through the plate and on the third side by a curved surface likewise thus extending, the meeting of said curved and straight surfaces being for the greater part prevented by substantially cylindrical openings passing from the reverse side of said plate toward but not to the obverse side thereof.

10. A die for forming fillets consisting of a plate having a substantially three-sided aperture therein, two sides of the latter being bounded by right-angled planes and one side by a curved surface, the plate being rendered thinner by drilling from the reverse side at points near the meeting of said curved surface and planes, thus providing substantially cylindrical feed-passages for material that is extruded near said points.

HARRY J. JACOBSON.